DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 10

T917,009

THERMOPLASTIC POLYOLEFIN MOLDING COMPOSITIONS CONTAINING GLASS FIBERS WHICH HAVE BEEN TREATED WITH AN ANIONIC EMULSION OF A MODIFIED POLYOLEFIN

Max F. Meyer, Jr., 509 Altamont 37663; Frederick B. Joyner, 404 Meadow Lane 37663; and Willis C. Wooten, Jr., 521 Lakewood Road 37660, all of Kingsport, Tenn.

Filed Apr. 2, 1973, Ser. No. 347,003
Int. Cl. C08f *45/10*
U.S. Cl. 260—41 AG
No Drawing. 15 Pages Specification

This invention relates to polyolefin/glass fiber compositions containing glass fiber which have been treated with an anionic or nonalkali emulsion of a modified polyolefin. These compositions form molded objects having significantly higher tensile strengths and heat-distortion temperatures and are more hydrolytically stable than similar molded articles made with glass fiber coated with an alkali-containing emulsion of a modified polyolefin.